(12) United States Patent
Clark

(10) Patent No.: US 10,872,534 B2
(45) Date of Patent: Dec. 22, 2020

(54) AERIAL VEHICLE INSPECTION PATH PLANNING

(71) Applicant: Kespry, Inc., Menlo Park, CA (US)

(72) Inventor: Robert Parker Clark, Palo Alto, CA (US)

(73) Assignee: Kespry, Inc., Menlo Park, CA (US)

(*) Notice: Subject to any disclaimer, the term of this patent is extended or adjusted under 35 U.S.C. 154(b) by 373 days.

(21) Appl. No.: 15/800,898

(22) Filed: Nov. 1, 2017

(65) Prior Publication Data

US 2019/0130768 A1  May 2, 2019

(51) Int. Cl.
| | |
|---|---|
| *G08G 5/00* | (2006.01) |
| *B64C 39/02* | (2006.01) |
| *G06T 17/05* | (2011.01) |
| *G06K 9/00* | (2006.01) |

(52) U.S. Cl.
CPC ......... *G08G 5/0039* (2013.01); *B64C 39/024* (2013.01); *G06K 9/0063* (2013.01); *G06K 9/00637* (2013.01); *G06T 17/05* (2013.01); *G08G 5/0034* (2013.01); *G08G 5/0069* (2013.01); *G08G 5/0086* (2013.01); *B64C 2201/024* (2013.01); *B64C 2201/027* (2013.01); *B64C 2201/042* (2013.01); *B64C 2201/108* (2013.01); *B64C 2201/12* (2013.01); *B64C 2201/127* (2013.01); *B64C 2201/141* (2013.01); *B64C 2201/146* (2013.01)

(58) Field of Classification Search
CPC .. G08G 5/0039; G08G 5/0034; G08G 5/0069; G08G 5/0086; B64C 39/024; G06K 9/0063; G06K 9/00637; G06T 17/05
See application file for complete search history.

(56) References Cited

U.S. PATENT DOCUMENTS

| | | | |
|---|---|---|---|
| 6,463,343 B1 | 10/2002 | Emens et al. | |
| 6,813,559 B1 | 11/2004 | Bodin et al. | |
| 6,856,894 B1* | 2/2005 | Bodin .................. | G05D 1/0044 244/75.1 |
| 7,107,148 B1 | 9/2006 | Bodin et al. | |
| 7,130,741 B2 | 10/2006 | Bodin et al. | |
| 7,228,232 B2 | 6/2007 | Bodin et al. | |
| 7,231,294 B2 | 6/2007 | Bodin et al. | |

(Continued)

FOREIGN PATENT DOCUMENTS

| | | |
|---|---|---|
| CN | 205353774 U | 6/2016 |
| CN | 106576383 A | 4/2017 |

(Continued)

OTHER PUBLICATIONS

Elfes, Alberto. "Using Occupancy Grids for Mobile Robot Perception and Navigation." Computer 22.6 (1989): 46-57.

(Continued)

*Primary Examiner* — Behrang Badii
*Assistant Examiner* — Daniel L Greene
(74) *Attorney, Agent, or Firm* — Fenwick & West LLP

(57) ABSTRACT

Structure inspections are performed with a high resolution by first performing a modeling flight path at a relatively high altitude over the structure. Images are gathered during the modeling flight path and are used to generate a three dimensional model of the structure. From the three dimensional model a lower altitude closer inspection flight path is defined and executed.

24 Claims, 11 Drawing Sheets

(56) References Cited

U.S. PATENT DOCUMENTS

| | | | |
|---|---|---|---|
| 7,286,913 | B2 | 10/2007 | Bodin et al. |
| 7,363,157 | B1* | 4/2008 | Hanna .................. G01C 11/00 |
| | | | 702/5 |
| 7,418,320 | B1 | 8/2008 | Bodin et al. |
| 7,469,183 | B2 | 12/2008 | Bodin et al. |
| 7,509,212 | B2 | 3/2009 | Bodin et al. |
| 7,546,187 | B2 | 6/2009 | Bodin et al. |
| 8,019,490 | B2 | 9/2011 | Ferren et al. |
| 8,179,257 | B2 | 5/2012 | Allen et al. |
| 8,401,222 | B2 | 3/2013 | Thornberry et al. |
| 8,731,234 | B1* | 5/2014 | Ciarcia .............. G06K 9/00637 |
| | | | 382/100 |
| 8,902,308 | B2 | 12/2014 | Rinner et al. |
| 8,930,044 | B1 | 1/2015 | Peeters et al. |
| 8,965,598 | B2* | 2/2015 | Kruglick .............. B64C 39/024 |
| | | | 701/2 |
| 9,147,260 | B2 | 9/2015 | Hampapur et al. |
| 9,170,117 | B1 | 10/2015 | Abuelsaad et al. |
| 9,245,183 | B2 | 1/2016 | Haas et al. |
| 9,310,518 | B2 | 4/2016 | Haas et al. |
| 9,317,659 | B2 | 4/2016 | Balinski et al. |
| 9,323,895 | B2 | 4/2016 | Balinski et al. |
| 9,355,316 | B2 | 5/2016 | Stevens et al. |
| 9,363,008 | B2 | 6/2016 | Boss et al. |
| 9,447,448 | B1 | 9/2016 | Kozloski et al. |
| 9,460,616 | B1 | 10/2016 | Miyahira et al. |
| 9,463,875 | B2 | 10/2016 | Abuelsaad et al. |
| 9,467,839 | B1 | 10/2016 | Nishimura et al. |
| 9,471,064 | B1 | 10/2016 | Boland et al. |
| 9,481,460 | B1 | 11/2016 | Kozloski et al. |
| 9,513,635 | B1* | 12/2016 | Bethke .................. G01C 21/20 |
| 9,534,917 | B2 | 1/2017 | Abuelsaad et al. |
| 9,576,482 | B2 | 2/2017 | Yamamoto |
| 9,582,719 | B2 | 2/2017 | Haas et al. |
| 9,584,977 | B2 | 2/2017 | Yamamoto |
| 9,593,806 | B2 | 3/2017 | Allen et al. |
| 9,600,997 | B1 | 3/2017 | Abrahams et al. |
| 9,609,288 | B1* | 3/2017 | Richman ................ H04N 7/183 |
| 9,613,274 | B2 | 4/2017 | Stevens et al. |
| 9,632,509 | B1 | 4/2017 | Aphek et al. |
| 9,637,233 | B2 | 5/2017 | Bivens et al. |
| 9,639,960 | B1 | 5/2017 | Loveland et al. |
| 9,645,581 | B1* | 5/2017 | Yang .................. G08G 5/0069 |
| 9,646,493 | B2 | 5/2017 | Yamamoto |
| 9,659,503 | B2 | 5/2017 | Gordon et al. |
| 9,699,622 | B1 | 7/2017 | Nishimura et al. |
| 9,702,830 | B1 | 7/2017 | Akselrod et al. |
| 9,734,397 | B1 | 8/2017 | Larson et al. |
| 9,734,684 | B2 | 8/2017 | Bryson et al. |
| 9,734,725 | B2 | 8/2017 | Gordon et al. |
| 9,773,398 | B2 | 9/2017 | Abrahams et al. |
| 9,823,658 | B1 | 11/2017 | Loveland et al. |
| 9,836,047 | B2* | 12/2017 | Clark .................. G05D 1/0022 |
| 9,886,632 | B1 | 2/2018 | Loveland et al. |
| 9,922,405 | B2 | 3/2018 | Sauder et al. |
| 10,126,126 | B2* | 11/2018 | Clark .................. G05D 1/0094 |
| 2007/0271002 | A1* | 11/2007 | Hoskinson .......... G05D 1/0088 |
| | | | 700/245 |
| 2009/0015674 | A1 | 1/2009 | Alley et al. |
| 2010/0084513 | A1 | 4/2010 | Gariepy et al. |
| 2010/0100269 | A1 | 4/2010 | Ekhaguere et al. |
| 2010/0110074 | A1* | 5/2010 | Pershing .............. G06F 17/5004 |
| | | | 345/423 |
| 2010/0114537 | A1* | 5/2010 | Pershing .............. G06F 17/5004 |
| | | | 703/1 |
| 2012/0044710 | A1 | 2/2012 | Jones |
| 2013/0317667 | A1 | 11/2013 | Kruglick |
| 2014/0018979 | A1 | 1/2014 | Goossen et al. |
| 2014/0025229 | A1 | 1/2014 | Levien et al. |
| 2014/0316616 | A1* | 10/2014 | Kugelmass .......... G08G 5/0013 |
| | | | 701/8 |
| 2015/0254738 | A1 | 9/2015 | Wright et al. |
| 2016/0023760 | A1 | 1/2016 | Goodrich |
| 2016/0070265 | A1 | 3/2016 | Liu et al. |
| 2016/0132748 | A1 | 5/2016 | Tillotson |
| 2016/0178803 | A1 | 6/2016 | Haas et al. |
| 2016/0179096 | A1 | 6/2016 | Bradlow et al. |
| 2016/0191142 | A1 | 6/2016 | Boss et al. |
| 2016/0313736 | A1 | 10/2016 | Schultz et al. |
| 2016/0325835 | A1 | 11/2016 | Abuelsaad et al. |
| 2016/0327950 | A1* | 11/2016 | Bachrach .............. B64C 39/024 |
| 2017/0146344 | A1 | 5/2017 | Clark |
| 2017/0160752 | A1 | 6/2017 | Boland et al. |
| 2017/0176194 | A1 | 6/2017 | Gordon et al. |
| 2017/0178500 | A1 | 6/2017 | Miyahira et al. |
| 2017/0178501 | A1 | 6/2017 | Miyahira et al. |
| 2017/0188545 | A1 | 7/2017 | Bivens et al. |
| 2017/0213084 | A1 | 7/2017 | Akselrod et al. |
| 2017/0213455 | A1 | 7/2017 | Yamamoto |
| 2017/0285627 | A1* | 10/2017 | Feldmann ............ H04B 7/1851 |
| 2017/0308088 | A1* | 10/2017 | Sabe .................... G01C 11/025 |
| 2018/0004231 | A1* | 1/2018 | Michini ................ G05D 1/0094 |
| 2018/0122246 | A1* | 5/2018 | Clark .................... B64C 39/024 |
| 2018/0218533 | A1* | 8/2018 | Millin .................. G05D 1/0094 |
| 2018/0373248 | A1* | 12/2018 | Chornenky ............ G06F 3/0604 |

FOREIGN PATENT DOCUMENTS

| | | |
|---|---|---|
| DE | 112011103690 | 9/2013 |
| EP | 2881827 A1 | 6/2015 |
| GB | 2500839 A | 10/2013 |
| JP | 2008186145 A | 8/2008 |
| JP | 6095018 B2 | 3/2017 |
| WO | 2007124014 A3 | 8/2008 |
| WO | 2012175592 A1 | 12/2012 |
| WO | 2013141922 A9 | 9/2013 |
| WO | 2016015943 A1 | 2/2016 |
| WO | 2016203385 A1 | 12/2016 |
| WO | WO 2017/091768 | 6/2017 |

OTHER PUBLICATIONS

Hornung, Armin, et al. "OctoMap: An Efficient Probabilistic 3D Mapping Framework Based on Octrees." Autonomous Robots Preprint (2013): 1-17.

Pike, R. J., et al. Geomorphometry: a brief guide: Developments in Soil Science 33 (2009): 3-30.

Souza, Anderson AS, et al. "3D Probabilistic Occupancy Grid to Robotic Mapping with Stereo Vision." INTECH Open Access Publisher (2012): 181-198.

Vandeportaele, Bertrand, et al. "ORIENT-CAM, a camera that knows its orientation and some applications." Progress in Pattern Recognition, Image Analysis and Applications (2006): 267-276.

Beard, R. et al., "Cooperative Forest Fire Surveillance Using a Team of Small Unmanned Air Vehicles," All Faculty Publication, Paper 1228, Jan. 1, 2006, pp. 1-33.

PCT International Search Report and Written Opinion, PCT Application No. PCT/US2016/063669, dated Feb. 20, 2017, 14 pages.

Pesti, P. et al., "Low-Cost Orthographic Imagery," Proceedings of the 16th ACM SIGSPATIAL International Conference on Advances in Geographic Information Systems, Nov. 5-7, 2008, pp. 1-8.

Yahyanejad, S. et al., "Incremental Mosaicking of Images from Autonomous, Small-Scale UAVs," 2010 7th IEEE International Conference on Advanced Video and Signal Based Surveillance, Aug. 29-Sep. 1, 2010, pp. 1-8.

* cited by examiner

Roof Report

DIMENSIONS

| Slope | Area (m²) | Perimeter (m) | Pitch | Squares | Hail Strikes |
|---|---|---|---|---|---|
| A | 91.0 | 42.8 | 5"/12" | 0.9 | 8 |
| B | 99.3 | 48.6 | 5"/12" | 1.0 | 22 |
| C | 3.1 | 12.0 | 5"/12" | 0.0 | 0 |
| D | 42.6 | 31.0 | 5"/12" | 0.4 | 27 |
| E | 12.9 | 17.1 | 5"/12" | 0.1 | 2 |
| F | 6.1 | 11.8 | 5"/12" | 0.1 | 0 |
| G | 2.0 | 6.8 | 5"/12" | 0.0 | 0 |
| Totals | 257.0 | 170.0 | - | 2.6 | 59 |

FIG. 5B

AERIAL VEHICLE INSPECTION PATH PLANNING

BACKGROUND OF THE INVENTION

Field of the Invention

The described technology generally relates to unmanned aerial vehicles and, more specifically, to inspection path planning for unmanned aerial vehicles.

Description of the Related Art

An unmanned aerial vehicle, also commonly referred to as a drone, can travel through a variety of environments, such as indoor, outdoor, and/or mixed indoor and outdoor environments. In some cases, an unmanned aerial vehicle can be configured to conduct surveillance, mapping, delivery, inspection, asset tracking, or other tasks that can comprise combining movement and data collection. The unmanned aerial vehicle can travel over surfaces on which the unmanned aerial vehicle cannot safely land (e.g., water). As the vehicle performs such a "mission", it can travel according to a flight path. In the case of applications such as surveillance, monitoring, and inspection, large amounts of data may be gathered over the course of a mission. This data may be stored on the unmanned aerial vehicle during the mission, or some or all of the data may be transmitted by the unmanned aerial vehicle to a ground station or to a wide area network such as the internet.

SUMMARY OF THE INVENTION

The methods and devices of the described technology each have several aspects, no single one of which is solely responsible for its desirable attributes.

In one implementation, a method of gathering data with an unmanned aerial vehicle comprises executing first travel instructions with the unmanned aerial vehicle to perform a first flight path over a pre-defined area containing at least one feature of interest, wherein at least a portion of the first flight path is at an altitude above a threshold altitude, and acquiring images of the at least one feature of interest with the unmanned aerial vehicle while performing the first flight path. Based at least in part on the images acquired while performing the first flight path, a three-dimensional model of the at least one feature of interest is created. Based at least in part on the three-dimensional model, second travel instructions that define a second flight path are generated, wherein at least a portion of the second flight path is below the threshold altitude and is closer to the at least one feature of interest. The second travel instructions to perform the second flight path are executed with the unmanned aerial vehicle, and during the same mission, and additional images of the at least one feature of interest are acquired while performing the second flight path.

In another implementation, a system for gathering data regarding at least one feature of interest comprises an unmanned aerial vehicle comprising an image acquisition device, one or more processors, memory circuitry, and one or more wireless transceivers, a base station comprising one or more processors, memory circuitry, and one or more wireless transceivers for communicating wirelessly to the unmanned aerial vehicle during flight, and a computing device comprising one or more processors, memory, and a user interface configured to receive input from a user of the system to define a two dimensional geographic area containing the at least one feature of interest for unmanned aerial vehicle operation. Image processing software is resident in the memory of one or more of the unmanned aerial vehicle, base station, and computing device configured to receive images acquired during unmanned aerial vehicle operation and to generate a three dimensional model of the at least one feature of interest based at least in part on the acquired images. Travel instruction generation software is resident in the memory of one or more of the unmanned aerial vehicle, base station, and computing device configured to generate first travel instructions defining a first flight path based at least in part on the defined two dimensional area and to generate second travel instructions defining a second flight path based at least in part on the generated three dimensional model.

In another implementation, a method of inspecting a structure or component thereof with an unmanned aerial vehicle comprises defining a two dimensional geographic area containing the structure or component thereof, automatically defining a modeling flight path within the defined geographic area, wherein the modeling flight path comprises a generally horizontal serpentine path above the structure or component thereof, and performing the defined modeling flight path with the unmanned aerial vehicle and acquiring images during the performance thereof. Substantially contemporaneously with the completion of the modeling flight path, a three dimensional model of the structure or component thereof is automatically generated based at least in part on the acquired images. Substantially contemporaneously with the completion of the creation of the three dimensional model, an inspection flight path based at least in part on the created three dimensional model is automatically generated. Substantially contemporaneously with the completion of defining the inspection flight path, the inspection flight path is performed with the unmanned aerial vehicle and images are acquired during the performance thereof.

BRIEF DESCRIPTION OF THE DRAWINGS

These drawings and the associated description herein are provided to illustrate specific embodiments of the described technology and are not intended to be limiting.

FIG. 5B is an illustration of an example hail damage roof report.

DETAILED DESCRIPTION OF THE PREFERRED EMBODIMENT

Figure 1:
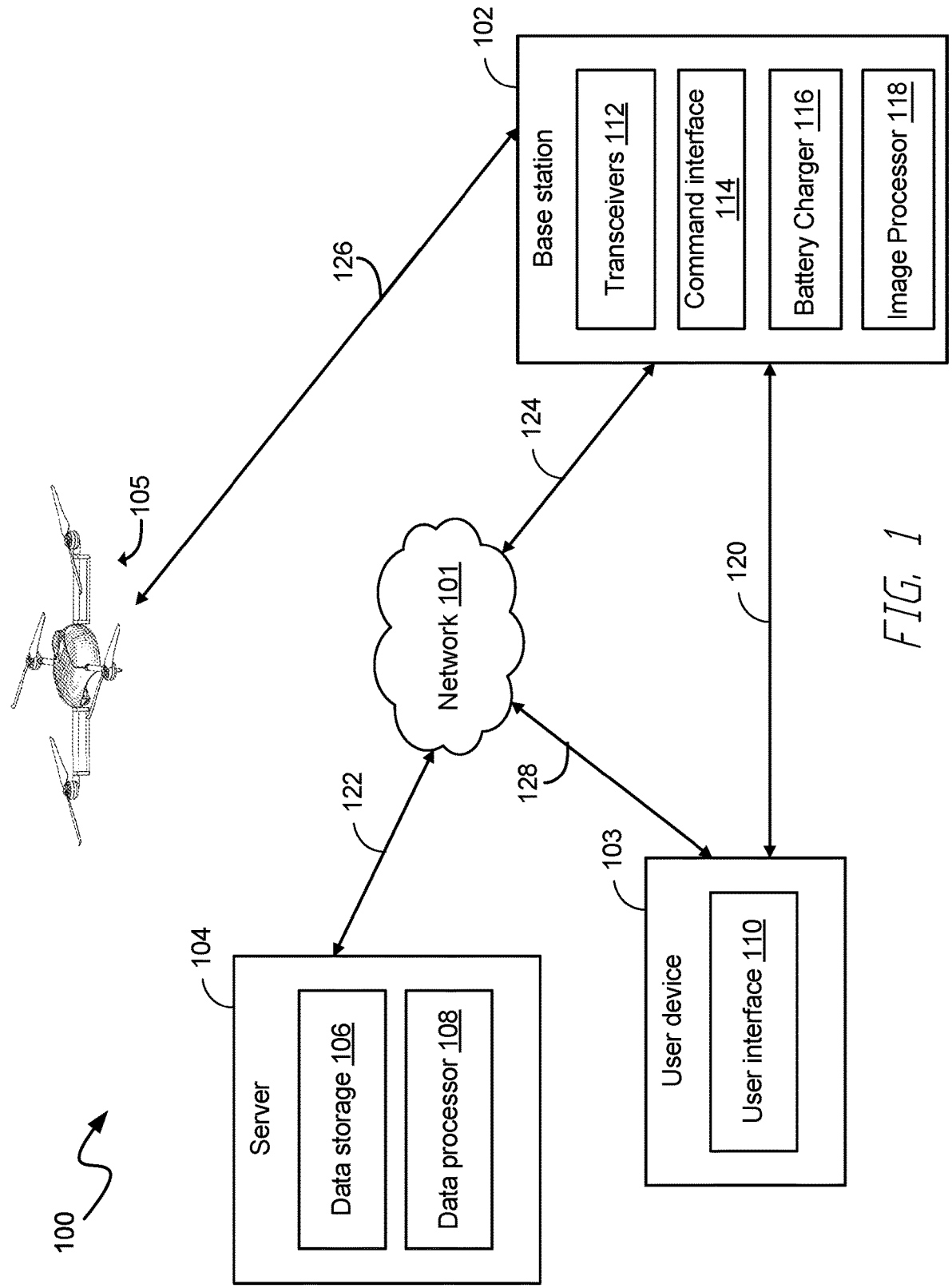
FIG. 1 is a diagram showing an example unmanned aerial vehicle system according to one embodiment.

Various aspects of the novel systems, apparatuses, and methods are described more fully hereinafter with references to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatuses and/or methods which are practiced using structure and/or functionality in addition to or different than the various aspects specifically set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

The term "unmanned vehicle," as used herein, refers to a vehicle that is configured to operate without an on-board operator (e.g., a driver or pilot). An "unmanned aerial vehicle," or "UAV," as used herein, can denote an unmanned vehicle whose physical operational capabilities include aerial travel or flight. Such a vehicle may be autonomous or semi-autonomous by, for example, executing travel instructions stored in an on-board memory rather than being controlled in real-time manually by wireless commands sent from an operator on the ground. The travel instructions may be executed by one or more on-board processors or microcontrollers that control various components of the unmanned aerial vehicle to control the vehicle's travel along a flight path. The pre-programmed travel instructions may define a mission that the unmanned aerial vehicle performs. Aspects of a mission may include a flight path and instructions to gather a defined set of data during performance of the flight path such as photographs or sensor measurements. An unmanned aerial vehicle can be an aircraft that is configured to take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station. In some cases, an unmanned aerial vehicle may be programmed to react to an unexpected obstacle in its flight path. If an obstacle is detected, the unmanned aerial vehicle may slow down, stop or change course to avoid the obstacle.

An unmanned aerial vehicle can be used to perform missions in an open and/or distant airspace. The missions performed by the unmanned aerial vehicle can be pre-programmed to one or more processors of the unmanned aerial vehicle or can be communicated to the one or more processors during its flight in real time. Furthermore, the unmanned aerial vehicle can be configured to gather and/or store aerial data and/or send the gathered and/or stored aerial data to at least one stationary device forming a communication portal as it performs its missions. Aerial data is data gathered by the unmanned aerial vehicle with sensors during the flight. Aerial data may include what may be referred to as payload data, which means data gathered by the unmanned aerial vehicle regarding its surroundings such as images, video, LIDAR, ultrasound, infrared, processed data such as 3D mapping data, or environmental measurements such as gas sensor data. The payload data is typically the information the flight is being performed to collect and deliver to the user. Aerial data also includes what may be termed telemetry data, which is data regarding the status and activities of the unmanned aerial vehicle during the flight such as velocity, position, attitude, temperature, and rotor speeds. Such data may be collected to retain records or logs of flight activity and perform diagnostics.

FIG. 1 is a diagram showing an example unmanned aerial vehicle system according to one embodiment. The illustrated system 100 includes a base station 102, a user device 103, a server 104, and one or more unmanned aerial vehicles 105. The base station 102, the user device 103, and the server 104 can be in communication via a network 101 using communication links 122, 124, 128. The user device 103 and the base station 102 can also be in communication using a local communication link 120, and the base station 102 and the unmanned aerial vehicles 105 can be in communication using one or more aerial vehicle communication links 126. The base station 102 may include transceivers 112, a command interface 114, and a battery charger 116. As will be further described below, the base station may also include one or more processors having software implemented image processing capabilities 118. The server 104 may include data storage 106 and a data processor 108, and the user device 103 may include a user interface 110. Although the unmanned aerial vehicles 105 illustrated in FIG. 1 are quadcopters each having four arms with their respective rotors, the disclosure herein can be implemented in other types of unmanned aerial vehicles such as a multirotor helicopter having a different number of arms and/or rotors or an aerial vehicle other than a multirotor helicopter such as a fixed wing aerial vehicle. Further details of components of the unmanned aerial vehicles 105 are discussed in connection with FIG. 3 below.

The network 101 can be a global network which may include or comprise the Internet, enabling communication between remotely located devices and servers, and as such the communication links 122, 124, 128 can be implemented using wireless communication technologies currently implemented for mobile telephone and smart phone communications such as Long Term Evolution (LTE) or any other suitable technologies (e.g. GSM, other 3GPP family protocols, WiFi) generally having throughput data rates of 300 kbps or above. In some embodiments, one or more of the communication links 122, 124, 128 can be implemented using wired communication technologies such as fiber-optic cables or any other suitable technologies providing a similar throughput range as discussed above. Although not illustrated in FIG. 1, the unmanned aerial vehicles 105 may be equipped with communication circuits to interface with network 101 using established mobile telephone network protocols and infrastructures.

The local communication link 120 between the user device 103 and the base station 102 can be implemented, for example, with a local Wi-Fi network (described further below) or any other suitable network generally allowing data rates of 300 kbps or above. In some embodiments, the base station 102 may act as a local network hub such as a Wi-Fi access point, and in other embodiments, the user device 103 may act as a local network hub. In other embodiments, a separate device (not shown) may be used to implement a local network hub.

The aerial vehicle communication link 126 between the base station 102 and one of the unmanned aerial vehicles 105 can be implemented in whole or part with a local communication link using the 900 MHz band (e.g. 902-928 MHz ISM/amateur radio band) or any other suitable link generally having a throughput capacity of less than 300 kbps (kilobits per second) and at least 5 kilometers of range with low (preferably no) packet loss, preferably 10 kilometers of range with low (preferably no) packet loss, and more preferably 60 kilometers of range with low (preferably no) packet loss. The communication link 126 may also be implemented in whole or part, for example, with a local Wi-Fi network link or any other suitable network protocol.

The server 104 can be a remote server configured to, for example, receive, process, and store aerial data collected by the unmanned aerial vehicles 105. The server 104 can receive the aerial data from the base station 102 or the user device 103 or the unmanned aerial vehicle 105 through the network 101 using the communication links 122, 124, 128. Further details of the data communications between the unmanned aerial vehicles 105 and the base station 102 are discussed in connection with FIGS. 2, 3 below. In some embodiments, the server 104 can be implemented with multiple servers in multiple locations, and one or more parts of the server 104 may be distributed and in communication with one another through the network 101. The data storage 106 can be a computer storage device (e.g., hard disk drive (HDD) storage, solid state drive (SSD) storage, or flash memory) to store data received through the network 101. The data processor 108 may be implemented with one or more suitable computer processors capable of processing the data received thought the network 101, such as aerial data from the unmanned aerial vehicles 105.

The base station 102 can be a portable module placed near a take-off point for the flight path of an unmanned aerial vehicle that can collect data from the unmanned aerial vehicles 105. In some embodiments, the base station 102 may also act as a hub to the local network between the unmanned aerial vehicles 105 and the user device 103. The base station 102 can include transceivers 112 and a command interface 114. The transceivers 112 can be devices capable of transmitting and receiving data to and from a system, device, or module external to the unmanned aerial vehicle. For example, the transceivers 112 may include radio frequency (RF) transceivers capable of communicating data over a Wi-Fi network, LTE network, or any other suitable network in various frequency bands or channels, such as 900 MHz, 2.4 GHz, 5 GHz, etc. In some embodiments, the transceivers 112 may be implemented with a combination of separate transmitters and receivers. The command interface 114 can be an interface configured to receive user command inputs, and the battery charger 116 can be configured to receive or connect to one or more batteries of the unmanned aerial vehicles 105.

The user device 103 can be a portable user device, such as a tablet computer, smart phone, or laptop computer capable of receiving user inputs and transmitting user input data to the base station 102 to affect the operation of the unmanned aerial vehicle. For example, the user input data may include commands or flight plan changes, and the user device 103 may send the commands to the base station 102 using the local communication link 120. In some embodiments, the user input data may include a designated area of interest for the unmanned aerial vehicle 105 to observe and gather relevant aerial data. In some embodiments, the user input data may include specific areas to avoid when the unmanned aerial vehicle 105 is performing its mission. The base station 102 can process and/or send the commands received from the user device 103 to the unmanned aerial vehicles 105 using one of the aerial vehicle communication links 126.

The user device 103 may also be configured to allow user access to the data stored in the data storage 106 of the server 104. The user device 103 may further include a transceiver (not shown), a processor (not shown), a display (not shown), and a user input means (not shown) to allow user interaction and transmitting, receiving, and processing of data. In some embodiments, the data processor 108 may transform received data for a presentation to a user of the user device 103. For example, the received aerial data may include aerial images of a selected location, and the data processor 108 may process the images to generate a construction or landscape progress report. The processed data can be further accessed by the user device 103 through the network 101 using the communication link 128, and the user may navigate, manipulate, and edit the processed data using the user interface 110. In some embodiments, the processing of the received data may be performed in part or in all with the user device 103. In the abovementioned example, the user device 103 may receive raw or partially processed aerial image data, and a processor (not shown) associated with the user device 103 may further process the image data for user presentation, manipulation, and editing.

Figure 2:
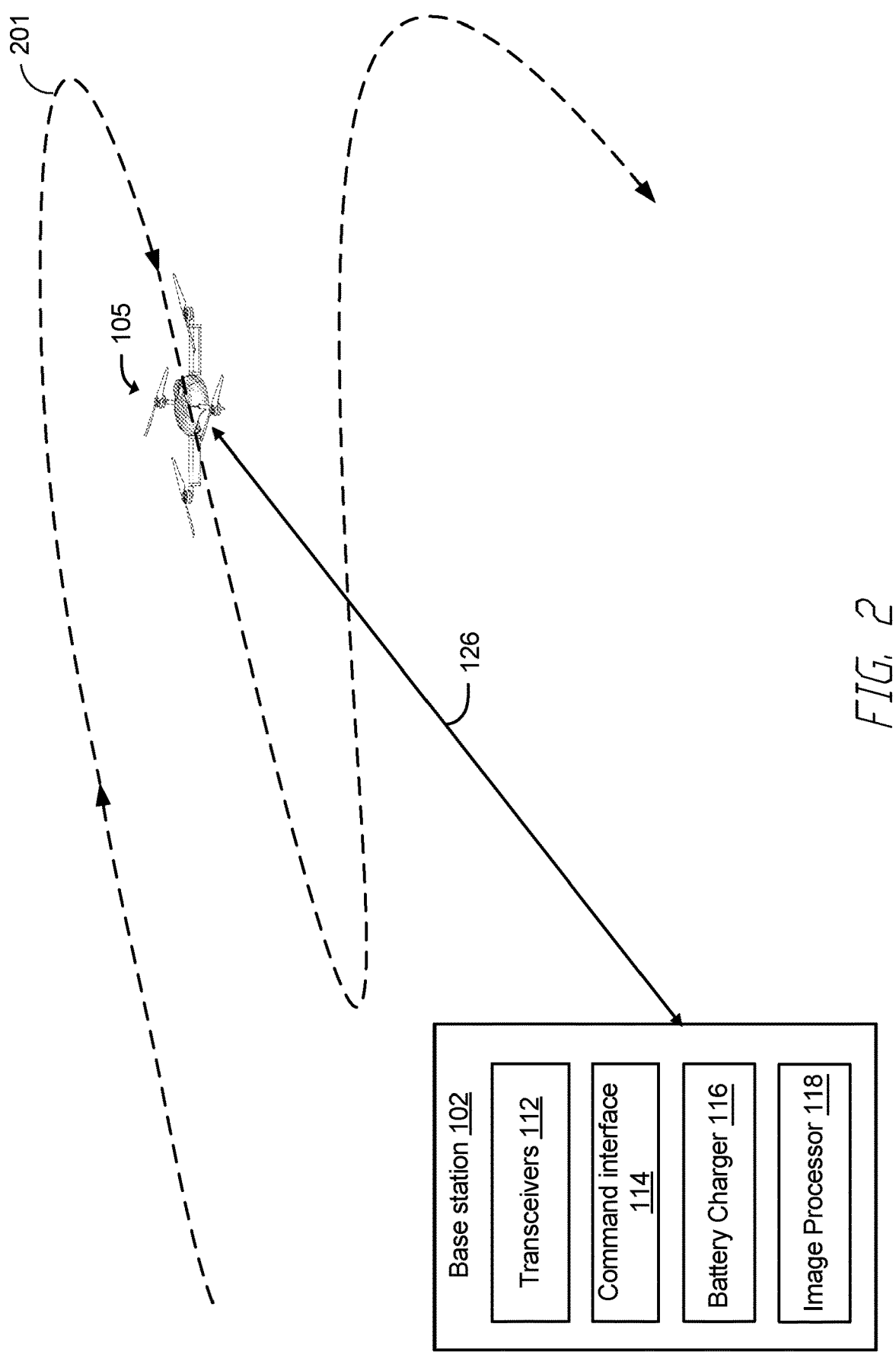
FIG. 2 is an illustration of a flight path of an unmanned aerial vehicle in the system of FIG. 1.

The illustration in FIG. 2 includes the unmanned aerial vehicle 105, a flight path 201, and aerial vehicle communication link 126. In the course of executing a mission, the unmanned aerial vehicle 105a may fly according to the flight path 201. In some embodiments, the flight path 201 can be determined based on the mission, known obstacles, or other surroundings. For example, the flight path 201 can be in a serpentine shape for a mission to take aerial photos of an open rectangular field. In some embodiments, the flight path 201 may be predetermined and sent to the unmanned aerial vehicle 105 before its flight begins. The flight path is defined by travel instructions that are executed by the unmanned aerial vehicle during the mission.

Figure 3:
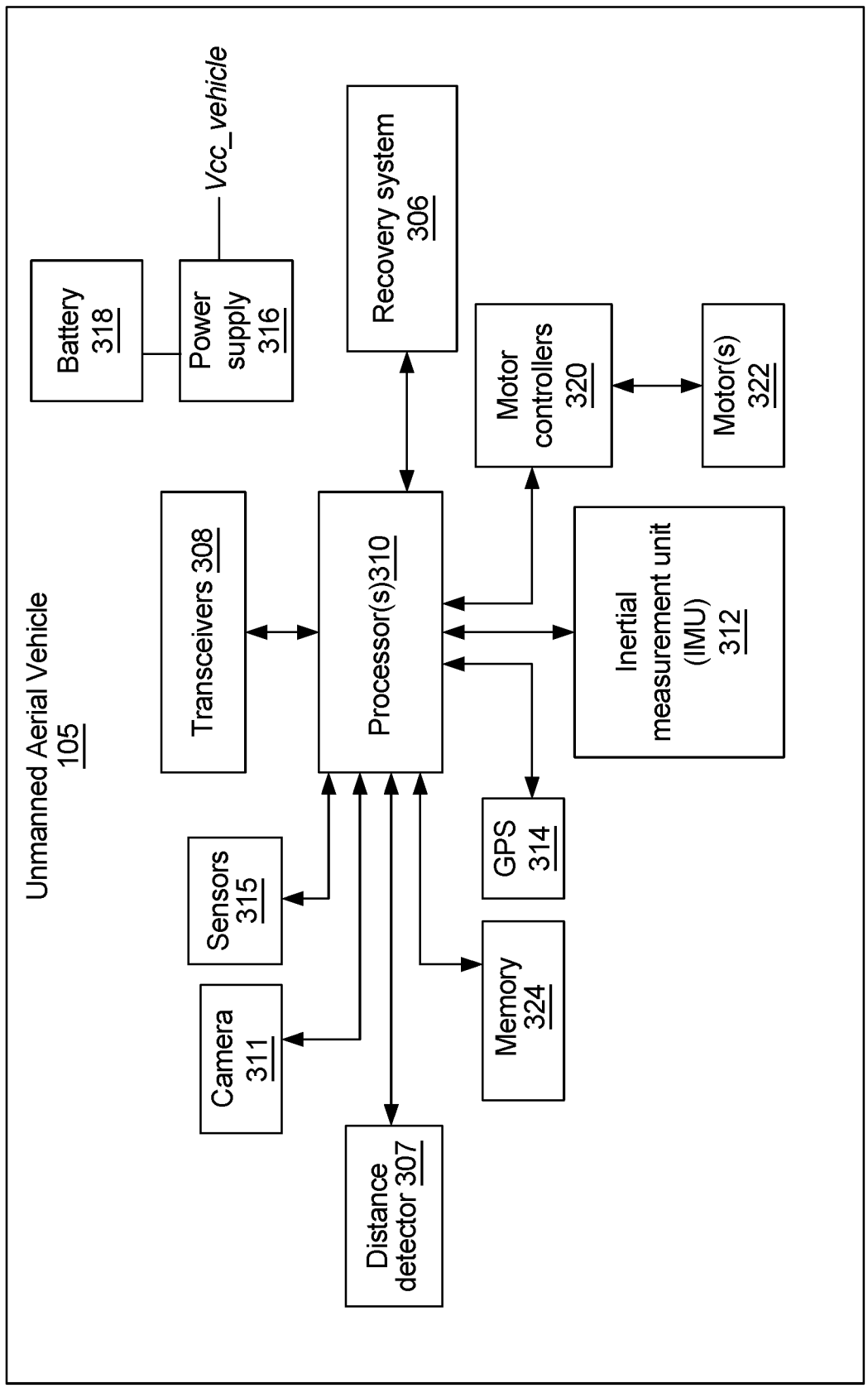
FIG. 3 is a block diagram of components of an unmanned aerial vehicle according to one embodiment.

FIG. 3 is a diagram showing components of an example unmanned aerial vehicle according to one embodiment. The vehicle 105 illustrated in FIG. 3 includes one or more processor(s) 310 in communication with a state estimator which may be an inertial measurement unit (IMU) 312. The processor 310 is in further communication with one or more transceivers 308, sensors 315, a distance detector 307, a camera 311, a global positioning system (GPS) module 314, memory 324, and motor controllers 320, which are in communication with motors 322. The vehicle 105 further includes a power supply 316 and a battery 318, which provides power to one or more modules of the vehicle 105, including the processor 310. The transceivers 308 and the GPS module 314 may be in further communication with their respective antennas (not shown). The memory 324 may store one or more of mission instructions, travel instructions, pre-mission routines, payload data, flight data and/or telemetry, settings, parameters, or other similarly relevant information or data. The vehicle 105 may also include a recovery system 306, which may be in communication with one or more components in the vehicle 105, including the processor 310. The vehicle 105 may include additional or intermediate components, modules, drivers, controllers, circuitries, lines of communication, and/or signals not illustrated in FIG. 3.

The vehicle 105 can perform its regular operation according to instructions executed by the processor 310 to, for example, take a course of action for a mission. The processor 310 can be a microprocessor capable of communicating with various modules illustrated in FIG. 3 executing instructions pre-programmed and/or received during a mission, for example. The processor 310 may receive instructions, settings, values, or parameters stored in the memory 324 and data from the sensors 315, the distance detector 307, the camera 311, the transceivers 308, the GPS module 314, the IMU 312, and the motor controllers 320 to evaluate the status of the vehicle 101 and determine a course of action. The status of the vehicle 105 can be determined based on data received through the sensors 315, the distance detector 307, and/or preloaded data stored in the memory 324 and accessed by the processor 310. For example, the altitude of the vehicle 105 above ground can be determined by the processor 310 based on a digital elevation model (DEM) of a world elevation map or with the distance detector 307 (e.g., a LIDAR), a barometer, or ultrasound. In some embodiments, the vehicle 105 may include multiple processors of varying levels of computing power and reliability to execute low-level instructions or run high-level application code or a virtual machine. In such embodiments, one or more of the functionalities of the processor(s) 310 described herein may instead be performed by another processor in the vehicle 105.

The transceivers 308 can be devices capable of transmitting and receiving data to and from a system, device, or module external to the vehicle 105. For example, the transceivers 308 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 308 may be implemented with a combination of separate transmitters and receivers. The motor controllers 320 may include a controller device or circuit configured to interface between the processor 310 and the motors 322 for regulating and controlling speed, velocity, torque, or other operational parameters of their respective, coupled motors 322. In some embodiments, one or more motor control schemes, such as a feedback control loop, may be implemented with the processor 310 and/or the motor controllers 320. The motors 322 may include electrical or any other suitable motors coupled to their respective rotors of the vehicle 105 to control their propellers, for example.

The memory 324 can be a memory storage device (e.g., random-access memory, read-only memory, flash memory, or solid state drive (SSD) storage) to store data collected from the sensors 315, the camera 311, data processed in the processor 310, or preloaded data, parameters, or instructions. In some embodiments, the memory 324 may store data gathered from the distance detector 307 using various computationally efficient data structures. For example, in some cases, the distance data from the distance detector 307 can be stored using a three-dimensional occupancy grid mapping, with the gathered data grouped into cube-shaped bins of variable resolution in space. Depending on the need of distance data for the various processes or operations described herein using distance data, the resolution of the occupancy grid can be determined to indicate whether each variable resolution bin within the reach of the distance detector is free or occupied based on the gathered distance data. In some embodiments, the three-dimensional occupancy mapping values can be estimated using probabilistic approaches based on the gathered distance data. Furthermore, such three-dimensional occupancy grid mapping can aid or be part of the dynamic or adaptive topology based data gathering as disclosed herein.

The IMU 312 may include a stand-alone IMU chip containing one or more magnetometers, gyroscopes, accelerometers, and/or barometers. In some embodiments, the IMU 312 may be implemented using a combination of multiple chips or modules configured to perform, for example, measuring of magnetic fields and vehicle orientation and acceleration and to generate related data for further processing with the processor 310. Regardless of integrated or multi-module implementation of the IMU 312, the term "magnetometer" as used herein, generally refers to the part(s) of the IMU 312 responsible for measuring the magnetic field at the location of the vehicle 105. Similarly, the term "accelerometer" as used herein, generally refers to the part(s) of the IMU 312 responsible for measuring acceleration of the vehicle 105, and the term "gyroscope" as used herein, generally refers to the part(s) of the IMU 312 responsible for measuring orientation of the vehicle 105.

The recovery system 306 can be responsible for recovery operation of the vehicle 101 to, for example, safely deploy a parachute and land the vehicle 105. The recovery system 306 may include a parachute (not shown) and an electromechanical deployment mechanism (not shown). The power supply 316 may include circuitry such as voltage regulators with outputs directly powering various modules of the vehicle 105 with Vcc_vehicle, and the battery 318 can provide power to the power supply 316. In some embodiments, the battery 318 can be a multi-cell lithium battery or any other suitable battery capable of powering the vehicle 105. In some embodiments, the battery 318 of the vehicle 105 can be removable for easy swapping and charging.

The sensors 315 may include one or more proximity sensors using, for example, infrared, radar, sonar, ultrasound, LIDAR, barometer, and/or optical technology. The sensors 315 may also include other types of sensors gathering data regarding visual fields, auditory signals, and/or environmental conditions (e.g., temperature, humidity, pressure, etc.). The GPS module 314 may include a GPS transceiver and/or a GPS driver configured to receive raw and/or processed GPS data such as ephemerides for further processing within the GPS module 314, with the processor 310, in post processing on server 104, or some combination of these alternatives. The vehicle 105 may also include a microphone (not shown) to gather audio data. In some embodiments, one or more sensors 315 responsible for gathering data regarding auditory signals can take the place of the microphone.

The distance detector 307 can include a LIDAR sensor, such as a one-, two-, or three-dimensional LIDAR sensor. In some embodiments, the distance detector 307 can be accompanied by one or more support structures or mechanical mechanisms for improving, augmenting, or enhancing its detectability. Also, in some embodiments, the distance detector 307 can be mounted on a strategic location of the vehicle 101 for ease of detection and control.

The camera 311 can be configured to acquire images and/or video. In some embodiments, one or more of the sensors 315 and the distance detector 307 responsible for gathering data regarding visual fields can take the place of the camera 311. In some embodiments, the sensors 315, the distance detector 307, and/or the camera 311 may be configured to gather parts of payload data, which includes data gathered by the vehicle 105 regarding its surroundings, such as images, video, and/or processed 3D mapping data, gathered for purposes of mission performance and/or delivered to the user for various purposes such as surveillance, mapping, inspection, monitoring, observation, progress reporting, asset tracking, landscape analysis, etc. The sensors 315 may also gather what may be termed telemetry data, which is data regarding the status and activities of the vehicle 105 during the flight such as velocity, position, attitude, temperature, and rotor speeds. Such data may be collected to retain records or logs of flight activity and perform diagnostics. In some embodiments, the sensors 315, the distance detector 307, and/or the camera 311 may also be configured to gather data for purposes of aiding navigation and obstruction detection.

Figure 4:
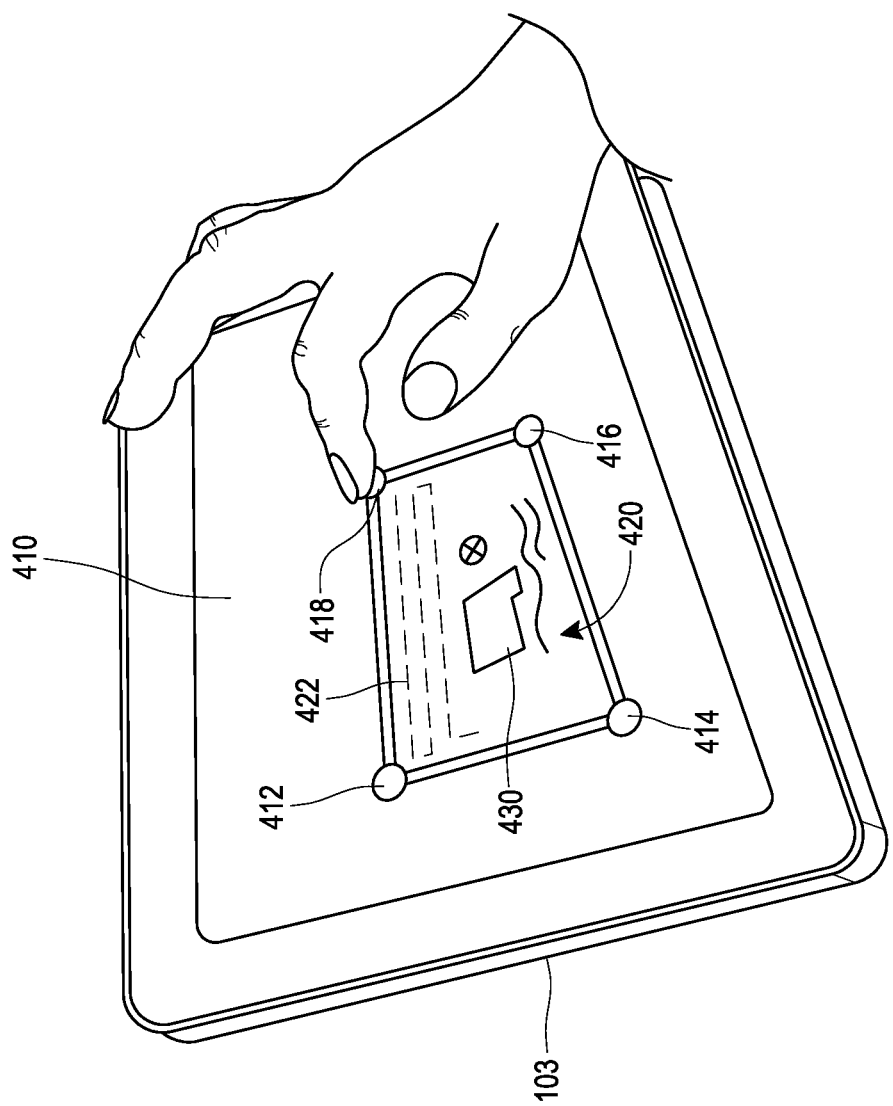
FIG. 4 is a diagram illustrating an operator defining a two dimensional geographic area for unmanned vehicle operation.

FIG. 4 shows a user device 103 comprising a touch screen user interface 410. The user device 103 may have any form of user interface, but it is advantageous for it to be a touch capable device such as a touch screen or touch pad. Such devices include smart phones, tablet computer devices, and touch screens and touch pads on laptops. Commercial embodiments of suitable touch screen enabled devices include a wide variety of smart phone and tablet computer devices such as the well-known iPhone® and iPad® devices. Gestures performed by a user with their fingertips (or sometimes a stylus) by touching and sliding their fingertips on the display/touch-screen interface in response to images on the display are interpreted by the device as instructions to perform particular functions.

As illustrated in FIG. 4, a user can configure the unmanned aerial vehicle for autonomous operation by interacting with the user device. The user device 103 may include a publicly available aerial mapping application, such as Google Maps for example, and the user may navigate the application to display a desired region at a particular desired scale. The user may then create a polygon on the display with the touchscreen by tapping on a series of points, such as 412, 414, 416, and 418 that define the vertices of the polygon. This defines a geographic area 420 within which autonomous unmanned aerial vehicle operation is intended to occur. The geographic area 420 may include at least one feature of interest 430 that the user desires to acquire information about. In response to the user creating the polygon, the user device 103 may automatically create a flight path, which may comprise a serpentine path 422 in a horizontal plane back and forth over essentially all of the pre-defined geographic area within the polygon. The horizontal plane containing the serpentine path may be at a default altitude or at user selected altitude. The altitude is typically sufficient to be sure the horizontal plane containing the serpentine path is free from obstacles, and may depend on the nature of the structures or other objects in the geographic area 420.

The user device 103 may then generate travel instructions for the unmanned aerial vehicle to use when performing the flight path 422. These instructions may be uploaded to the memory of the unmanned aerial vehicle either directly from the user device 103 or the user device may send them to the base station 102, which then forwards them to the unmanned aerial vehicle.

Figure 5A:
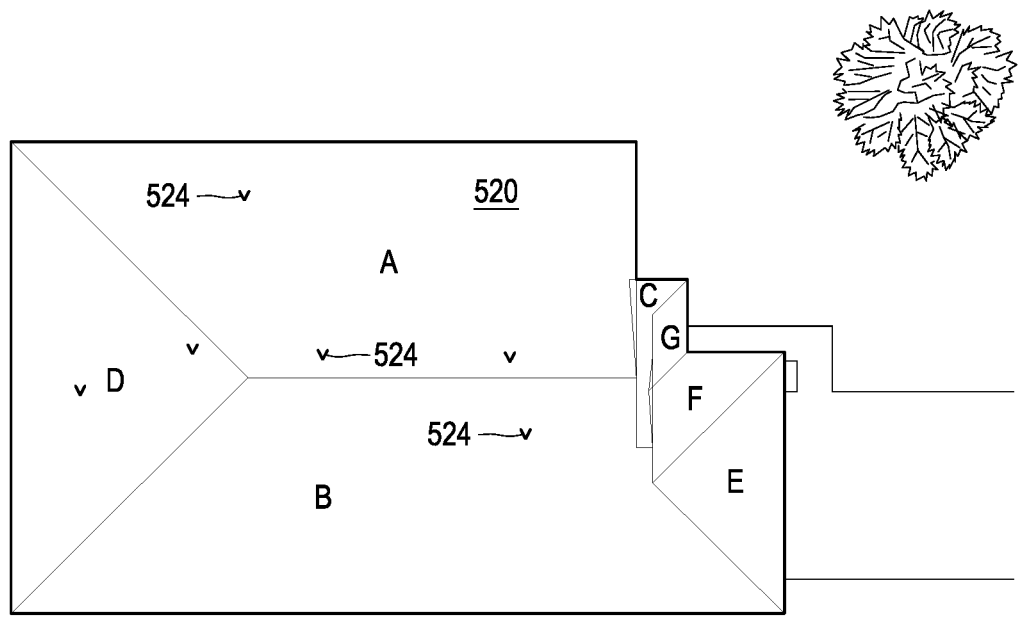
FIG. 5A is an illustration of an example roof inspection image.

FIGS. 5A and 5B illustrate one application of the system of FIGS. 1 through 4 in a structure inspection context. FIG. 5A shows a composite image of the roof 520 of a residential structure. In this example, the geographic area 420 defined by the polygon entered by the user into the user device 103 contained the structure and some of the surrounding area. The composite image of FIG. 5A was generated from a large number of images acquired by the unmanned aerial vehicle as it traveled along the serpentine flight path 422 generated by the user device 103 as it performed the serpentine flight path 422.

Image processing software which may be running on the server 104 may separately detect and characterize the differently sloped roof portions, labeled A, B, C, D, E, F, and may also detect locations of hail strikes 524 on the roof. FIG. 5B shows a report that may be generated from this image processing. In this example, the user may be an insurance adjuster or roofing contractor that is estimating repair costs for a damaged roof.

To successfully utilize unmanned aerial vehicles for inspection purposes such as this, it is important that the user does not need to be an expert in flight management and control of unmanned aerial vehicles. It is advantageous for the user to have to do as little as possible to have a successful flight. The features of the user device 103 and in general the system of FIG. 1 allow a successful flight with the user simply identifying the location to inspect on an aerial map and tapping in a polygon containing the relevant area. Everything else is done in an automated manner by the system.

However, this simplicity for the user produces limitations on the complexity of the autonomous flight path generated by the user device 103. Generally, such paths are at a single altitude for all flights, which must be high enough to avoid obstacles for a wide variety of structure heights. The path 422 cannot be tailored to the height or other dimensions of the structure (beyond the simple polygon definition) because the user generally does not have information about such dimensions, and even if they did, it would be very complicated for a user to select and input the relevant information into the user device 103 for a more tailored flight path. The system would become difficult to use and would require an expert to basically design individual flight paths for every structure or other feature of interest inspected. It has not been possible to retain simplicity of operation and at the same time generate more complex inspection travel paths that can be closer to the object inspected for more detailed data gathering.

Figure 6:
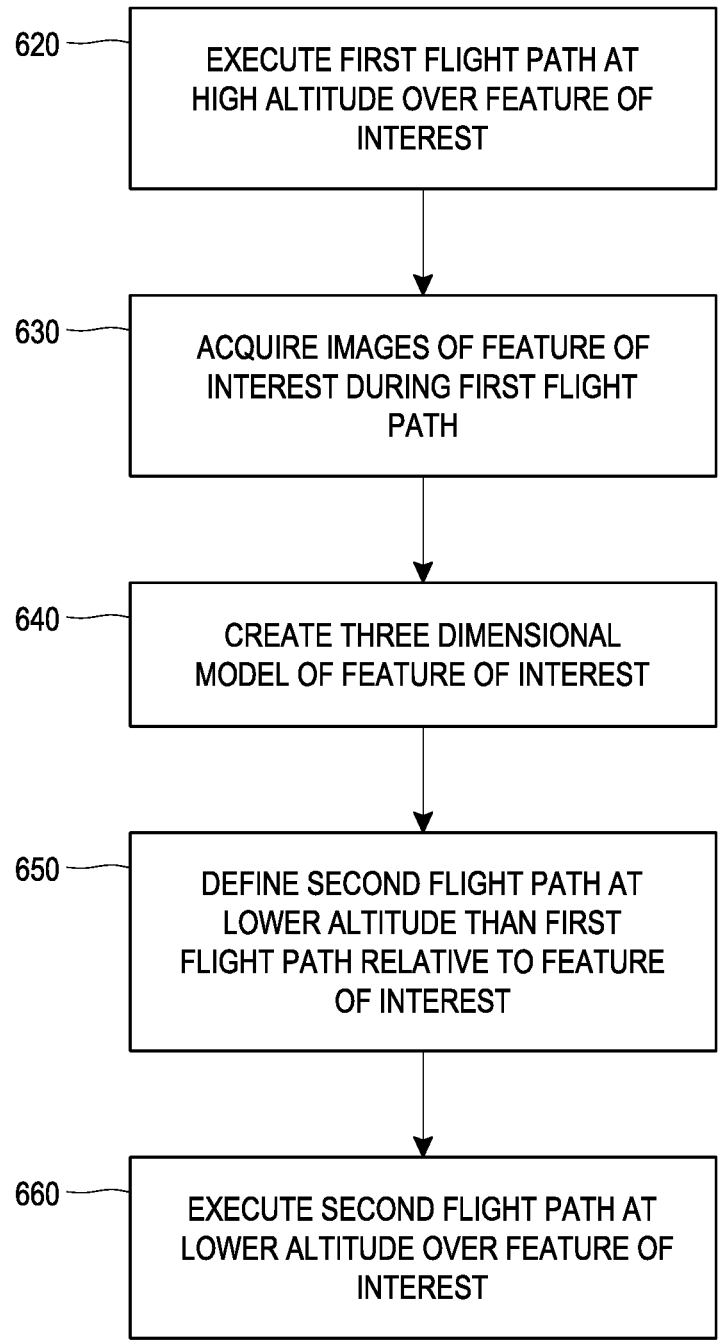
FIG. 6 is a flow chart of a method of performing an inspection in one implementation.

FIG. 6 is a flowchart of a method to retain the simplicity of the system described above, but generate more complex flight paths tailored to the characteristics of the feature of interest being inspected. Generally speaking, the method involves performing a first flight path to gather initial information about the previously defined geographic area (e.g. as described above with reference to FIG. 4). From this information, a second flight path more tailored to the feature of interest is generated and performed.

Accordingly, at block 620, a first flight path at a first altitude is performed by the unmanned aerial vehicle. To perform this first flight path, travel instructions for the unmanned aerial vehicle that are generated based at least in part on input to the user device 103, such as a serpentine flight path covering the geographic area specified by the user may be executed by the unmanned aerial vehicle 105. The first altitude may be high enough such that it is easy to be certain, or at least nearly certain, that there will be no obstacles or at least that the obstacles are sparse and avoidable encountered by the unmanned aerial vehicle 105 as it executes the first flight path. At block 630, images of the feature of interest (and possibly the entire pre-defined geographic area) under the first flight path are gathered. At block 640, a three dimensional model of the feature of interest is created. It may also be beneficial in some circumstances to create a three-dimensional model of objects or feature near the feature of interest as well, or possibly the entire predefined geographic area and all features therein. At block 640, this three dimensional model is used to automatically create travel instructions for the unmanned aerial vehicle that define a second flight path at a lower altitude than the first altitude relative to the feature of interest. Advantageously, the second flight path instructions may be generated without the unmanned aerial vehicle returning to the ground. At block 660, the travel instructions for the second flight path at the lower altitude may then be executed by the unmanned aerial vehicle. While performing the second flight path, additional more detailed images and/or other information about the feature of interest may be acquired.

Figure 7A:
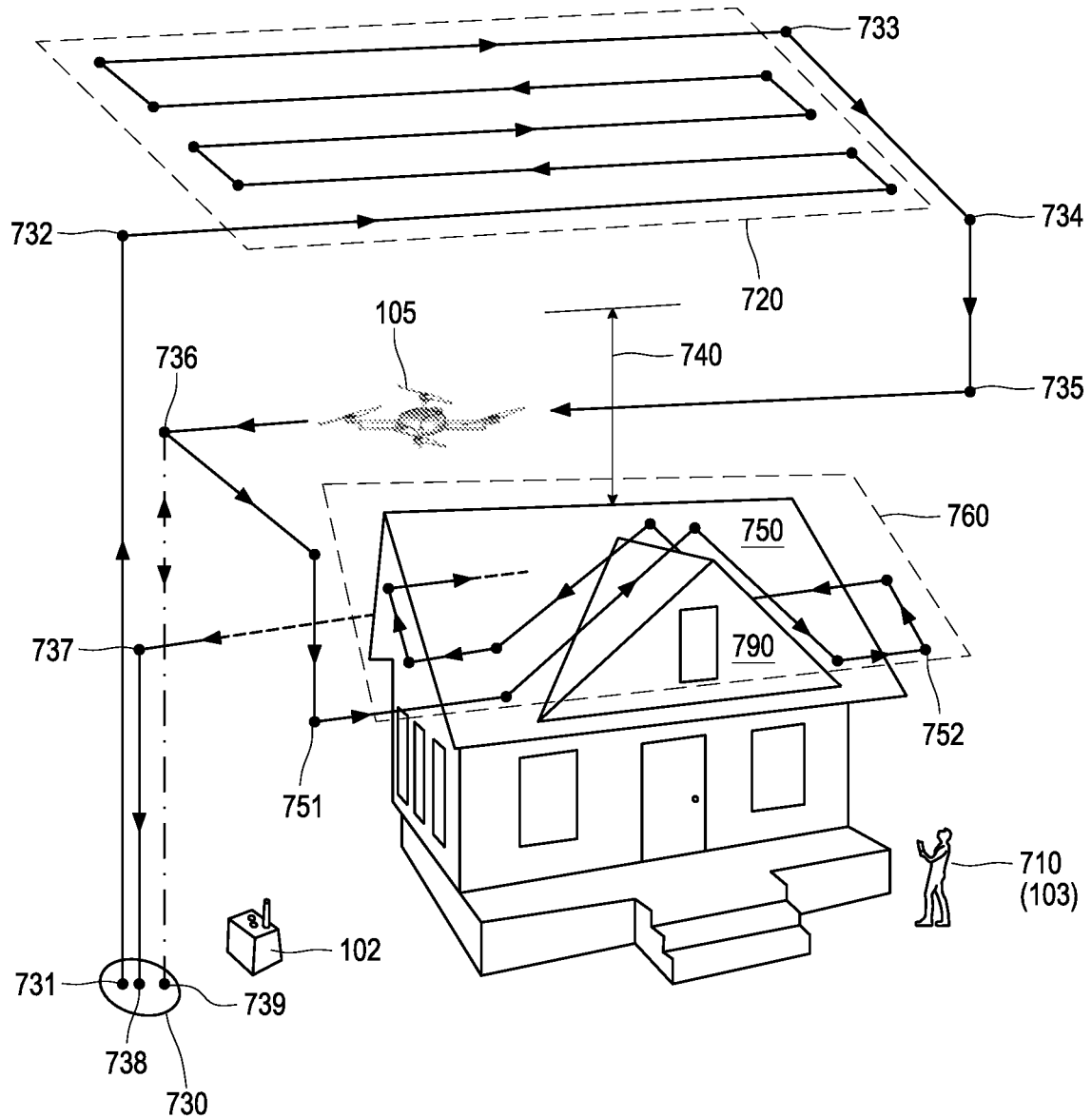
FIG. 7A is an illustration of a modeling flight path and an inspection flight path for a roof of a residential structure.

FIG. 7A illustrates an example application of the method of FIG. 6 to a roof inspection procedure. In FIG. 7A, a user 710 accesses a user device 103, and creates a polygon that contains the roof 750 to be inspected as described above. The user device (or other component of the system as described above) may use this polygon to define a serpentine path 720 within the user defined polygon. The serpentine path 720 may be performed in a horizontal plane at a substantially constant initial altitude. The altitude at which the serpentine path 720 is performed may be domain dependent, e.g. if the user 710 is an insurance adjuster that uses the unmanned aerial vehicle 105 to inspect the roofs of residential houses for damage, the system may assign an altitude for the serpentine flight path in the 50 to 100 foot range, intended to be high enough to ensure that the serpentine path 720 is at least a safe distance 740 above the highest point of structures being inspected and also above surrounding objects such as trees or the like in all, or at least almost all, situations such a user would encounter when using the unmanned aerial vehicle. If the user is inspecting multi-story commercial buildings, wind turbines, power lines, or the like, the height of the serpentine path will likely be higher than for residential buildings.

As shown in FIG. 7A, after the system generates the first travel instructions including the serpentine flight path 720 and loads them into the unmanned aerial vehicle 105, the unmanned aerial vehicle 105 may take off from a takeoff/landing area 730 from initial point 731. A set of flight instructions may comprise a series of locations that the unmanned aerial vehicle travels to in a particular order at defined speeds between different points. In accordance with such a set of instructions, during the first flight path (sometimes referred to herein as the modeling flight path) the unmanned aerial vehicle may travel essentially vertically from the take off point 731 to a second point 732. From point 732 the unmanned aerial vehicle may perform the serpentine path 720 in the polygon originally defined by the user 710. At the end of the serpentine path 720, the unmanned aerial vehicle reaches point 733.

During performance of the serpentine path 720, images of objects in the area under the serpentine path are acquired. With appropriate coverage of the area, and with knowledge of image acquisition location and camera orientation when the images were acquired during the flight, a three-dimensional model of the area, or at least the feature of interest, can be created after the unmanned aerial vehicle completes the serpentine flight path 720 and reaches point 733. The portion of the unmanned aerial vehicle travel between points 732 and 733 is sometimes referred to herein as the "modeling flight path."

Software algorithms for generating three-dimensional models from these images are known in the art, and are currently used in many image processing applications. These algorithms can require significant computational power to complete in a reasonable time frame. In the system of FIG. 7A, this computational power could be provided on the unmanned aerial vehicle 105 such that the three dimensional model is created from the acquired images by processing circuitry and memory located on the vehicle 105. However, to reduce power consumption and weight for the unmanned aerial vehicle, it is advantageous to place the processor circuits and memory for model generation in the base station 102. Using processing circuitry in the base station 102 to perform the modeling computations has the advantage that it need not be done on the unmanned aerial vehicle 105, and it also eliminates the need to send image data to a remote processing system over a relatively slow and/or costly communication link such as a wireless smartphone system (3G, 4G, LTE, etc.) with transfer over the internet to the remote processing system. During the modeling flight path, the unmanned aerial vehicle can download the images it is acquiring to the base station 102 for processing. After the modeling flight path is complete at, for example, point 733 or thereafter, the base station 102 can process the acquired images to generate a three-dimensional model of at least the roof 750.

Following the modeling flight path, the unmanned aerial vehicle 105 may hover at point 733 or 736 (or any other point) or land temporarily while the base station 102 creates the three dimensional model. Upon completion of the three dimensional model, additional flight instructions can be sent from the base station 102 to the unmanned aerial vehicle 105 that are generated using the three dimensional model in a manner that allows the unmanned aerial vehicle 105 to inspect the roof 750 at a closer distance than is conventionally possible.

Figure 7B:
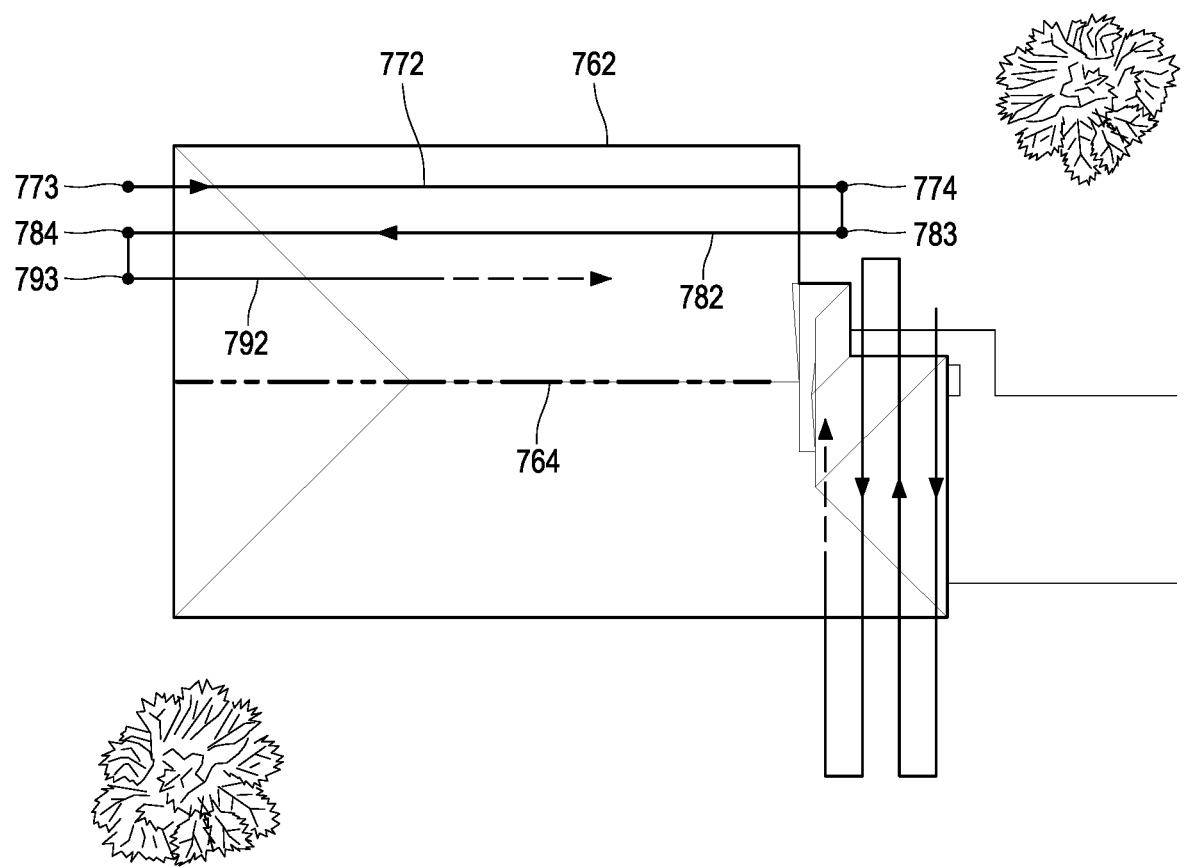
FIG. 7B is an illustration of generating travel instructions for an inspection flight path for a roof.

The additional set of flight instructions can be generated in a manner that is similar to the two-dimensional serpentine path planning that current systems already perform. As shown in FIG. 7B, an orthomosaic image of the roof and surrounding area can be generated by using the images collected during the modeling flight path using methods known in the art. The outline of the roof can be defined as one or more polygons using edge detection techniques, defining an area within the polygon(s) in an automated manner. These automated polygon(s) can then be used in a manner similar to the manually drawn polygon(s) described above. The polygon(s) may be filled with one or more planar serpentine paths in the conventional manner.

The three-dimensional model can then be used to define how high the unmanned aerial vehicle travels when executing these serpentine paths. The three-dimensional model provides a height (z) at each (x,y) location in, for example, the orthomosaic image of FIG. 7B. The simplest way to use this information is to maintain planar serpentine paths but set the height at just above (e.g. one meter above) the maximum z-value in the region covered by the serpentine path(s). This can be an improvement over conventional methods as the user need not estimate a structure height to allow the unmanned aerial vehicle 105 to fly closer to the surface being inspected than would normally be used. This method will also avoid chimneys, trees, or other tall structures that are within the polygon(s) containing the serpentine flight path.

A slightly more complex, but still relatively simple way to use the three-dimensional model is to analyze each linear segment of the previously defined serpentine path separately for an appropriate altitude. For example, the maximum z-value present along each individual segment of the serpentine path may be determined. The altitude of the flight path for each segment may be independently set as a buffer distance (e.g. one meter as described above) above the maximum z-value that exists along that segment. Referring again to FIG. 7B as an example, the serpentine path containing segments 772, 782, and 792 may be traversing a sloped planar roof section that increases in height from the outer eave edge 762 to a central ridge line 764. In the first part of flight path instruction creation as described above, the (x,y) positions of the points 773, 774, 783, 784, and 793 are defined. To obtain an altitude, the maximum z-value along path 772 between points 773 and 774 is found, and the altitude of path 772 is defined as the maximum z-value of the model plus a buffer distance. The same procedure can be performed for the segment 782 between points 783 and 784. If the roof is sloping up in this direction, segment 782 will be at a higher altitude than segment 772, and both will be above the surface of the roof along their respective paths by the buffer distance. The shorter paths linking the longer segments, e.g., the segment from point 774 to point 783, can be defined as a straight line from point 774 to point 783 that will slope upward along the sloping roofline. Alternatively, this segment could be split into two segments, and the unmanned aerial vehicle 105 could ascend vertically from point 774 to the higher altitude of point 783 first, and then travel horizontally to point 783 to begin executing path 782. With this method, for a simple roof having two planar surfaces which meet at a central ridge line and slope up from eaves on either side, the unmanned aerial vehicle 105 will "walk" up one surface to the central ridge line, and then down the other side, maintaining a near constant distance above the roof surface as each segment is executed.

Referring back to FIG. 7A, an "inspection flight path" which may be defined as the flight path from point 736 to 737 is illustrated. Using a three-dimensional model as described herein, the inspection path can be designed to follow the roof contours. The above described methods of generating paths that have different altitudes over different sections of the roof will work with roofs having any structure, even a highly complex one. For complex roofs, however, it may be desirable to generate more complex paths that follow the roof contours of such roof surfaces better than the methods described above. As an example, the roof of FIG. 7A includes a dormer 790 that is in the middle of a series of the serpentine segments.

In FIG. 7A, the inspection flight path includes a serpentine portion 760. To better follow structures like dormers 790, the altitude of the flight path along each segment can be based at least in part on a moving local average of z-values of the three-dimensional model for different positions along the segment. For example, the three-dimensional model generated by the system may define a z-value for the roof surface at a resolution of every ten centimeters along a segment. At each of these ten centimeter separated points along the segment, an average of a moving window of z-values of the three-dimensional model along the segment may be calculated. This produces a segment with a point every ten centimeters that moves up and down depending on the local average z-value of the model. If a buffer distance (e.g. one meter) is added to these segment values, then when the unmanned aerial vehicle 105 travels from point to point along the segment, it will gain and lose altitude according to the contour it is flying over.

To be sure the buffer distance is adequate, it is advantageous to consider the locations along the segment where the moving average is smaller than the actual z-value of the three-dimensional model at that point. Where this difference (moving average minus actual) is the most negative, the absolute value of that negative number may advantageously be added to the constant buffer distance. This will ensure that the distance between the unmanned aerial vehicle 105 and the surface of the roof directly under it is at least as much as the buffer distance, and sometimes more. Another possible refinement is to prune some of the 10 cm spaced points along the segment that are not necessary for the unmanned aerial vehicle to successfully travel along the segment. For example, from the starting point of a segment (e.g. point 751 of FIG. 7A) points can be discarded until the slope between a second point and the next third point is different. Then that portion of the path can be defined as a line segment between the first and second point, and a line segment between the second point and the third point, eliminating potentially many intermediate path points between the first point and the second point. That process can be repeated from the third point, and so on. These methods can produce a segment such as the one between points 751 and 752 of FIG. 7A which rises up and down over the central ridge of the dormer 790.

It will be appreciated that the above described methods of inspection flight path generation are applicable to many situations other than roofs. If a three-dimensional model generated from an initial modeling flight path defines a height z for every (x,y) in a region at a given (x,y) resolution, the methods described above can define an inspection flight path that will follow the z contour regardless of what kind of object, structure, terrain, vegetation, or anything else is the source of the varying height z as a function of (x,y) position. A mining site, for example, with pits in some places and piles of earth or rocks in others could be followed at a relatively constant desired height above the surface immediately below the unmanned aerial vehicle as the unmanned aerial vehicle flew over such piles and pits. Another example may be large storage yards with inventory of various kinds at different locations. It is often very difficult to track the exact location of different products in the yard. Using a modeling flight path to define an inspection flight path as described above can allow much higher resolution and identification of inventory in the yard. In some implementations, the techniques of finding image cues in gathered images and using those image cues to generate additional flight path instructions on the unmanned aerial vehicle itself as described in International Application PCT/US2016/063669, published as WO 2017/091768 is also performed during the inspection flight path. With this addition, the unmanned aerial vehicle can perform "sub-missions" within the inspection flight path to perform detailed data acquisition such as gather images of labels or bar codes on specific inventory items. The content of International Application PCT/US2016/063669, published as WO 2017/091768, is incorporated herein by reference in its entirety.

Figure 8A:
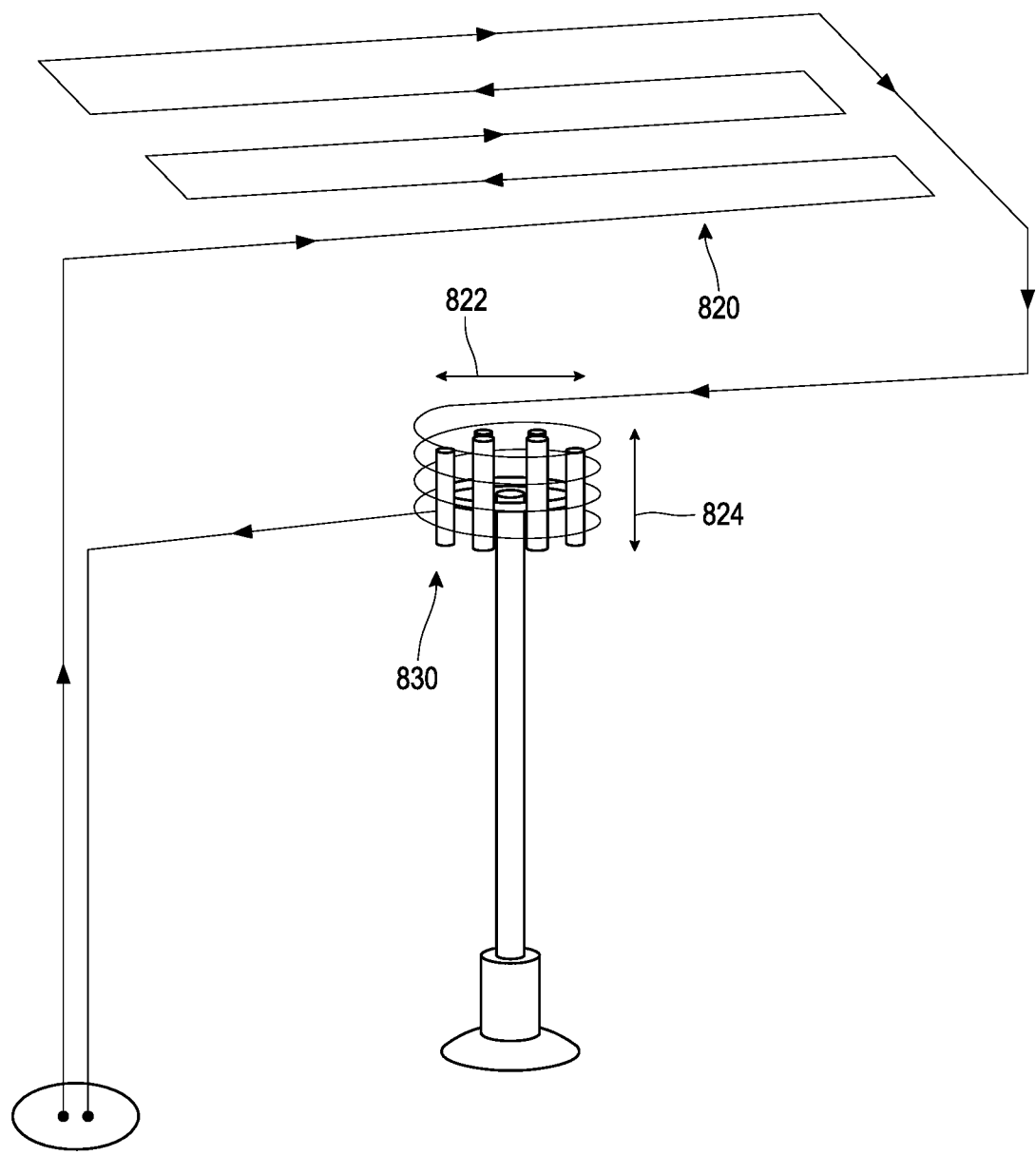
FIG. 8A is an illustration of a modeling flight path and an inspection flight path for a cell phone service tower.

There are other applications where the modeling flight path can be used to create different kinds of inspection flight paths that are especially applicable to particular inspection domains. For example, vertical structures such as towers, wind turbines, and the like are very difficult for a user to define an inspection flight path. As one example, illustrated in FIG. 8A, a telecommunications provider may wish to inspect its installed cell phone towers on a regular basis. In this domain, the three-dimensional model created with the images acquired during the modeling flight path 820 may be used to define a cylinder having a particular diameter 822, vertical extent 824, centered on and encompassing, at a buffer distance, the antenna array at the top of the tower. The inspection flight path may then include a corkscrew path 830 at a selected pitch around the outside of the defined cylinder.

Figure 8B:
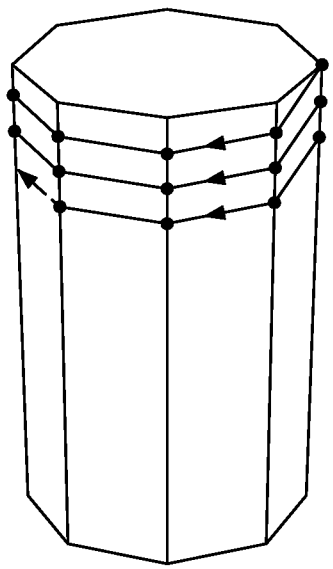
FIG. 8B is an illustration of generating travel instructions for an inspection flight path for a cell phone service tower.
Figure 8B:
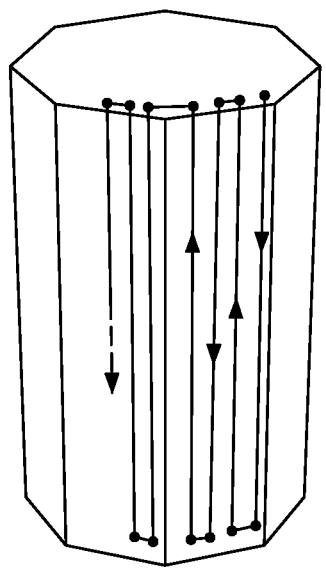

A more general scheme for inspecting vertical tower or tower-like structures is illustrated in FIG. 8B. In this example, the three-dimensional model can be used to define a vertically oriented prism that surrounds, at a buffer distance, the whole vertically oriented structure. The prism of FIG. 8B is octagonal. In the implementation illustrated on the top of FIG. 8B, inspection flight plan instructions may be generated by positioning points on the vertices of the polygon to perform a series of linear travel segments that form a corkscrew flight path around the tower or tower-like structure. As another alternative, illustrated at the bottom of FIG. 8B, serpentine travel paths can be defined in each face of the prism to create an inspection flight path.

In some advantageous embodiments, the above described process of executing a modeling flight path, generating a three-dimensional model, generating an inspection flight path based at least in part on the three dimensional model, and executing the inspection flight path, can be completed in a time frame that allows a user such as user 710 of FIG. 7A to be continuously present at the inspection site for a reasonable amount of time from initiation to completion of the process. In some cases, the roof inspection case for example, a report such as shown in FIGS. 5A and 5B can be generated as well in this same time frame, allowing an adjuster to close a claim while still at the site.

To achieve this speed, it is advantageous if the three dimensional model and the travel instructions for the inspection flight path are created proximate to the area of inspection/feature of interest, and this is possible if these computations are done by hardware and software that is located at or near the site of inspection. In the implementation of FIG. 7A, these computations are done in the base station 102, user device, 103, and unmanned aerial vehicle 105, or some combination thereof. These components are therefore preferably within 1000 meters of an object subject to inspection, more preferably within 100 meters of an object subject to inspection.

It is also advantageous if the three-dimensional model is generated substantially contemporaneously with completing the modeling flight path, the inspection path travel instructions are created substantially contemporaneously with completing the three-dimensional model, and the inspection flight path is performed substantially contemporaneously with creating the inspection path travel instructions. As used herein, these tasks are performed substantially contemporaneously if the series is completed within three hours. As shown in FIG. 7A, it is possible for the unmanned aerial vehicle 105 to land and take off again between the modeling flight path and the inspection flight path (the path between points 736 and 739 in FIG. 7A). It is advantageous if the modeling flight path and inspection flight path can be performed without having the unmanned aerial vehicle land, or to recharge or exchange the battery or batteries on the unmanned aerial vehicle 105. Given typical flight times on a single charge of generally one hour or less, it is advantageous if the unmanned aerial vehicle only has to wait ten minutes or less after completing the modeling flight path before obtaining the travel instructions for the inspection flight path. More advantageously, this period is less than three minutes. This can be accomplished by having local hardware perform the computations, such as on the base station 102 which can support significant processing power.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A method of gathering data with a single unmanned aerial vehicle comprising:
   executing first travel instructions with the single unmanned aerial vehicle to perform a first flight path of a first serpentine shape over a pre-defined geographic area containing at least one feature of interest, wherein at least a portion of the first flight path is at a first altitude;
   acquiring images of the at least one feature of interest with the single unmanned aerial vehicle while performing the first flight path;
   while the single unmanned aerial vehicle is in flight, creating a three dimensional model of the at least one feature of interest based on the images acquired by the single unmanned aerial vehicle while performing the first flight path;
   based at least in part on the three dimensional model, generating second travel instructions that define a second flight path of a second serpentine shape over at least a portion of the pre-defined geographic area by:
      determining heights of the at least one feature of interest in at least the portion of the pre-defined geographic area based on the three dimensional model; and
      determining respective second altitudes of the second flight path over at least the portion of the pre-defined geographic area, wherein at points along the second flight path, the respective second altitudes are lower than the first altitude and are higher than the heights of the at least one feature of interest;
   executing the second travel instructions with the single unmanned aerial vehicle to perform the second flight path; and
   acquiring additional images of the at least one feature of interest while performing the second flight path.

2. The method of claim 1, wherein the at least one feature of interest is a residential or commercial building.

3. The method of claim 1, wherein the pre-defined area is a polygon.

4. The method of claim 1, wherein the threshold altitude is 50 feet above a highest point of the at least one feature of interest.

5. The method of claim 1, wherein the three dimensional model is created proximate to the at least one feature of interest.

6. The method of claim 1, wherein the second travel instructions are created proximate to the at least one feature of interest.

7. The method of claim 1, wherein the pre-defined area is pre-defined on a touchscreen of a handheld device.

8. The method of claim 1, wherein the second flight path is contiguous with the first flight path.

9. The method of claim 1, wherein the first flight path and the second flight path are both completed without landing the single unmanned aerial vehicle.

10. The method of claim 1, wherein at least a portion of the second flight path is below a highest point of the at least one feature of interest.

11. The method of claim 1, wherein the single unmanned aerial vehicle is proximate to the at least one feature of interest for a continuous time period from prior to performing the first flight path to after performing the second flight path.

12. The method of claim 1, further comprising:
   based at least in part on the three dimensional model, identifying a plurality of polygons representative of the at least one feature of interest, wherein the single unmanned aerial vehicle is instructed to perform the second flight path of the second serpentine shape over a first portion of the pre-defined geographic area associated with a first polygon of the plurality of polygons;
   based at least in part on the three dimensional model, generating third travel instructions that define a third flight path of a third serpentine shape over a second portion of the pre-defined geographic area associated with a second polygon of the plurality of polygons, wherein at least a portion of the third flight path is at a lower altitude than the first altitude; and
   executing the third travel instructions with the single unmanned aerial vehicle to perform the third flight path.

13. The method of claim 1, wherein the second travel instructions are constrained by a pre-defined three dimensional shape associated with the at least one feature of interest.

14. The method of claim 13, wherein the second travel instructions define the second flight path along faces of the three dimensional shape.

15. A system for gathering data regarding at least one feature of interest, the system comprising:
   a single unmanned aerial vehicle comprising an image acquisition device, one or more processors, memory circuitry, and one or more wireless transceivers;
   a base station comprising one or more processors, memory circuitry, and one or more wireless transceivers for communicating wirelessly to the single unmanned aerial vehicle during flight;
   a computing device comprising one or more processors, memory, and a user interface configured to receive input from a user of the system to define a two dimensional geographic area containing the at least one feature of interest for unmanned aerial vehicle operation;
   image processing software resident in the memory of one or more of the single unmanned aerial vehicle, base station, and computing device configured to receive images acquired during unmanned aerial vehicle operation and to generate a three dimensional model of the at least one feature of interest based on the images acquired as the single unmanned aerial vehicle performs a first flight path;
   travel instruction generation software resident in the memory of one or more of the single unmanned aerial vehicle, base station, and computing device configured to generate first travel instructions defining the first flight path of a first serpentine shape over the defined two dimensional area and to generate second travel instructions defining a second flight path of a second serpentine shape over at least a portion of the defined two dimensional area based at least in part on the generated three dimensional model, wherein the image acquisition device is configured to acquire additional images of the at least one feature of interest as the single unmanned aerial vehicle performs the second flight path, wherein generating the second travel instructions comprises:
      determining heights of the at least one feature of interest in at least the portion of the two dimensional area based on the three dimensional model; and determining respective second altitudes of the second flight path over at least the portion of the two dimensional area, wherein at points along the second flight path, the respective second altitudes are lower than the first altitude and are higher than the heights of the at least one feature of interest.

16. The system of claim 15, wherein the single unmanned aerial vehicle, base station, and computing device are all proximate to the at least one feature of interest during operation of the single unmanned aerial vehicle.

17. The system of claim 15, wherein the image processing software is resident in the memory of the base station.

18. The system of claim 15, wherein at least some of the travel instruction generation software is resident in the memory of the computing device.

19. The system of claim 15, wherein the image processing software is distributed between two or more of the base station, the computing device, and the single unmanned aerial vehicle.

20. The system of claim 15, wherein the travel instruction generation software is distributed between two or more of the base station, the computing device, and the single unmanned aerial vehicle.

21. A method of inspecting a feature of interest with a single unmanned aerial vehicle, the method comprising:
defining a two dimensional geographic area containing the feature of interest;
defining a modeling flight path of a first serpentine shape within the defined geographic area, wherein the modeling flight path lies above the feature of interest at a first altitude;
performing the defined modeling flight path with the single unmanned aerial vehicle and acquiring images of the feature of interest while performing the defined modeling flight path;
responsive to the completion of the modeling flight path, creating a three dimensional model of the feature of interest based on the acquired images from the modeling flight path performed by the single unmanned aerial vehicle;
responsive to the completion of the creation of the three dimensional model, defining an inspection flight path of a second serpentine shape based at least in part on the created three dimensional model by:
determining heights of the feature of interest within the defined geographic area based on the three dimensional model; and
determining respective second altitudes of the inspection flight path over the feature of interest, wherein at points along the inspection flight path, the respective second altitudes are lower than the first altitude and are higher than the heights of the feature of interest; and
responsive to the completion of defining the inspection flight path, performing the inspection flight path with the single unmanned aerial vehicle and acquiring additional images of the feature of interest.

22. The method of claim 21, wherein the three dimensional model is created proximate to the feature of interest.

23. The method of claim 21, wherein the three dimensional model is created proximate to the feature of interest.

24. The method of claim 21, wherein the feature of interest comprises a roof of a building.

\* \* \* \* \*